June 13, 1967  M. W. FORTH  3,324,808
MATERIAL COMPRESSING MACHINE WITH ADJUSTABLE DIE MEANS
Filed Nov. 2, 1960  3 Sheets-Sheet 1
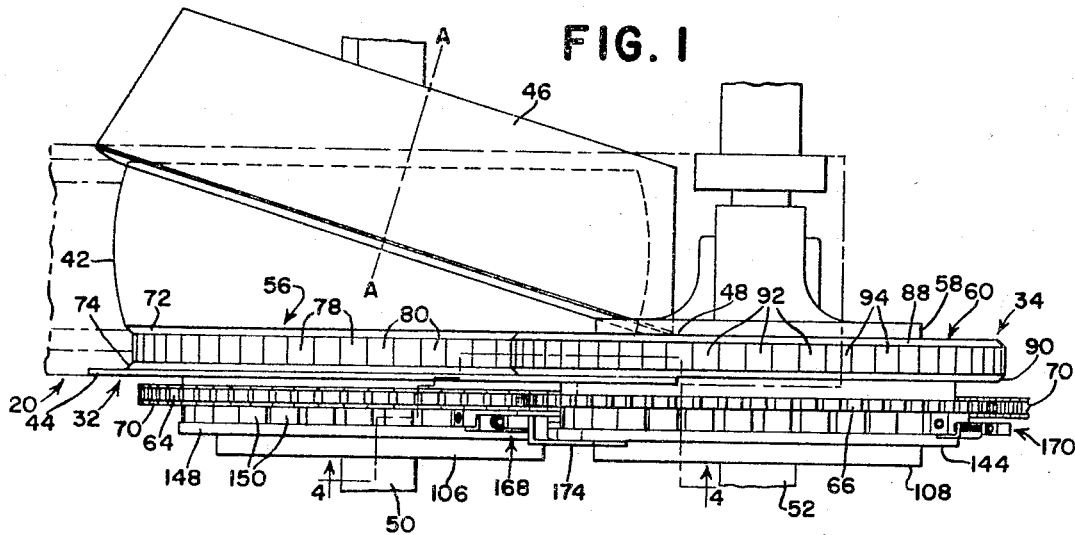
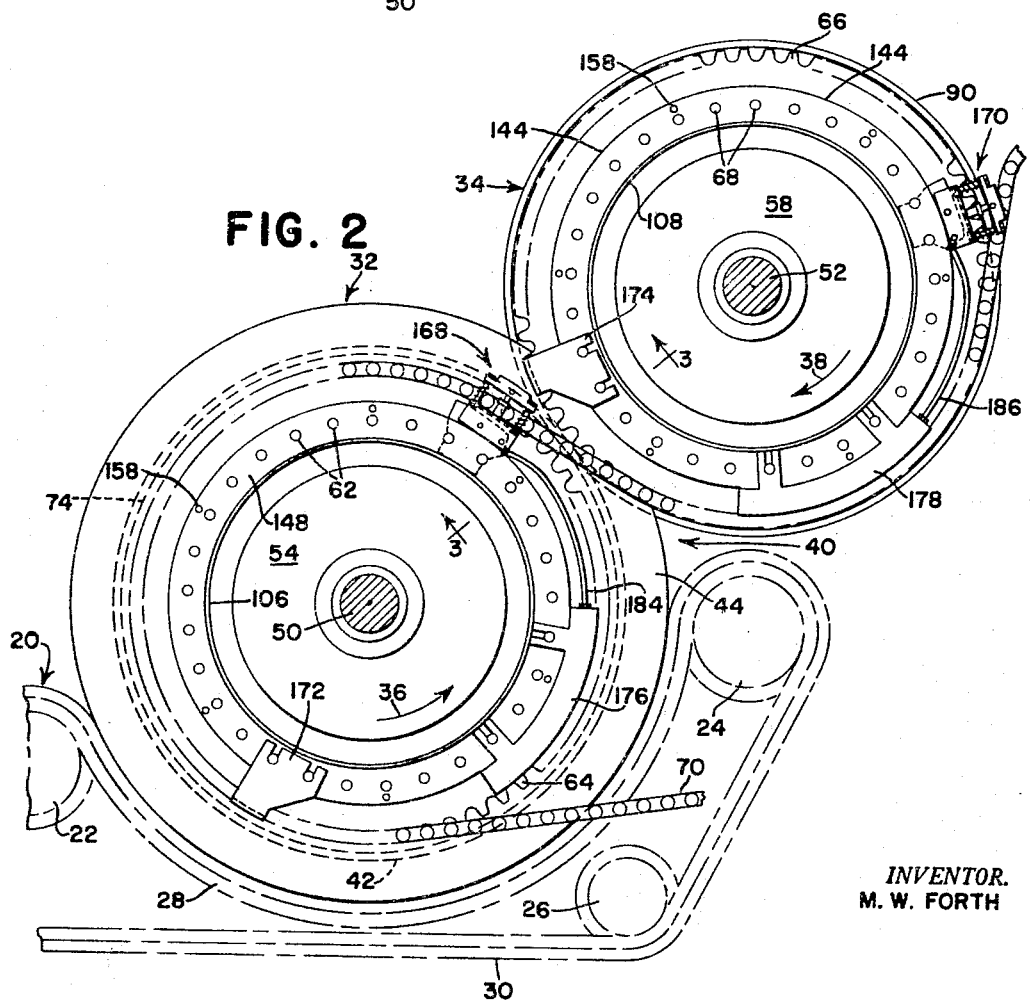
INVENTOR.
M. W. FORTH

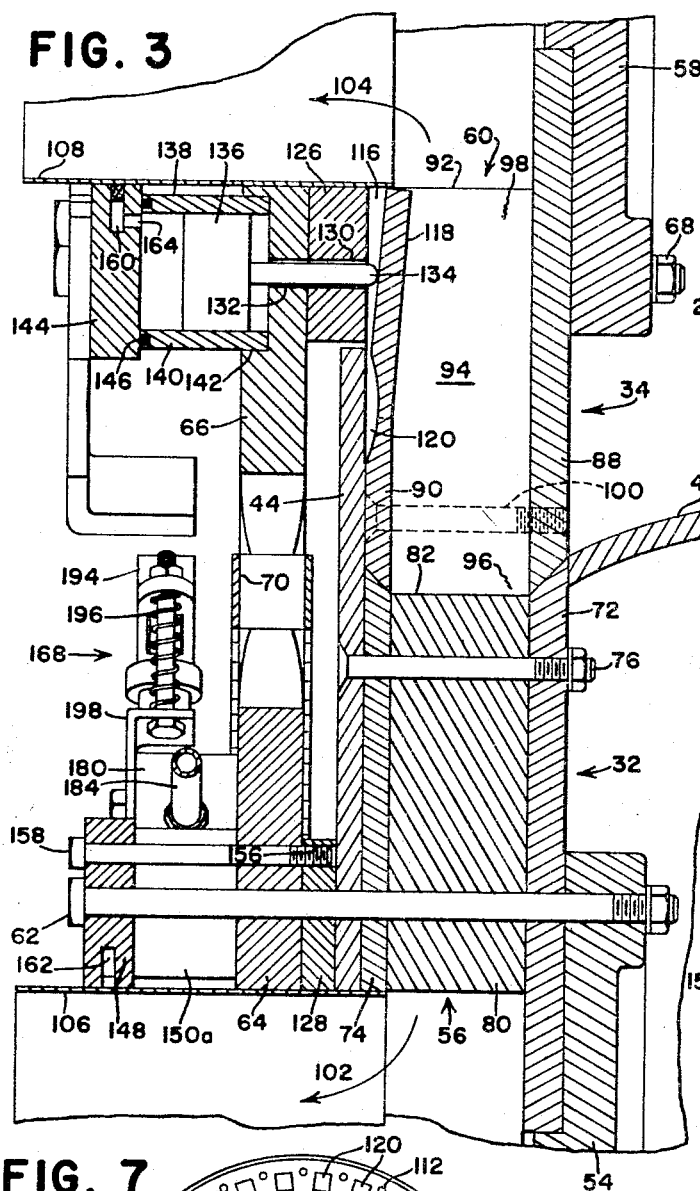

June 13, 1967  M. W. FORTH  3,324,808
MATERIAL COMPRESSING MACHINE WITH ADJUSTABLE DIE MEANS
Filed Nov. 2, 1960  3 Sheets-Sheet 3
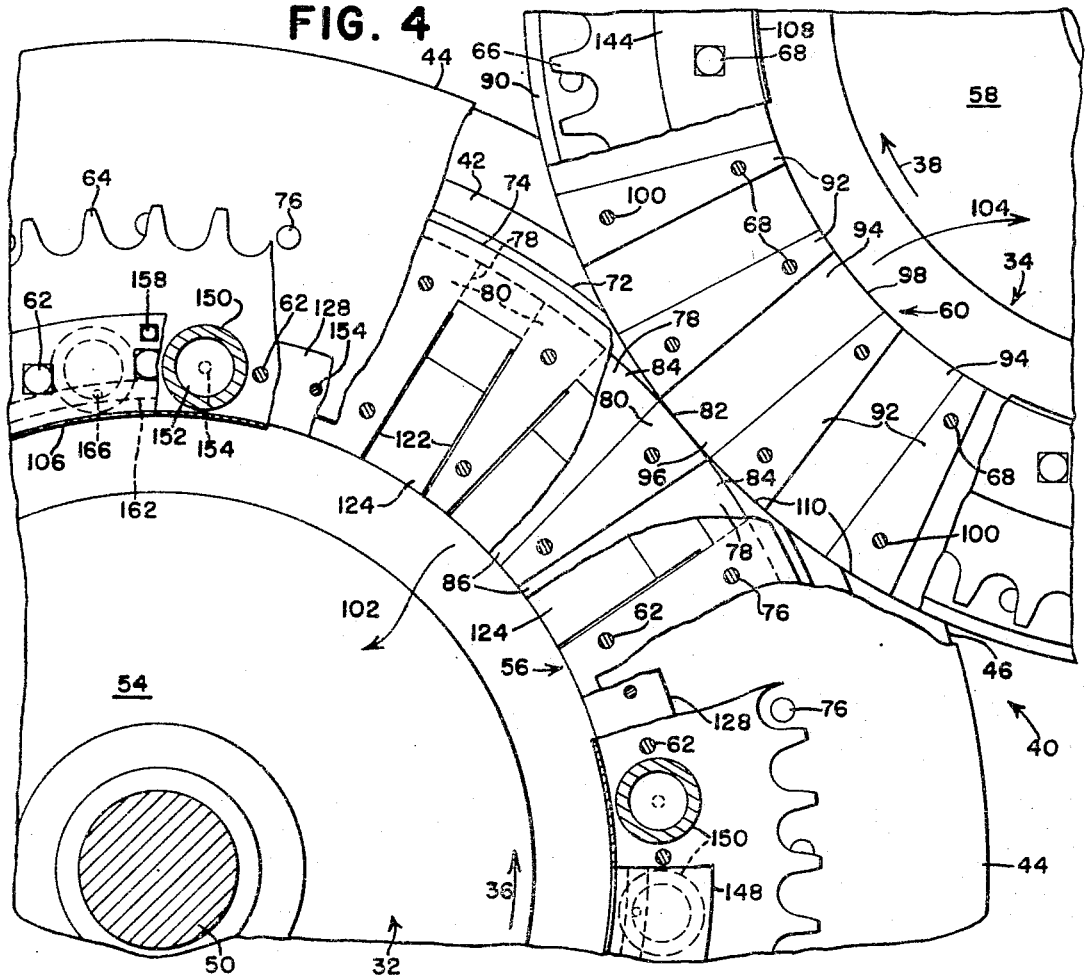
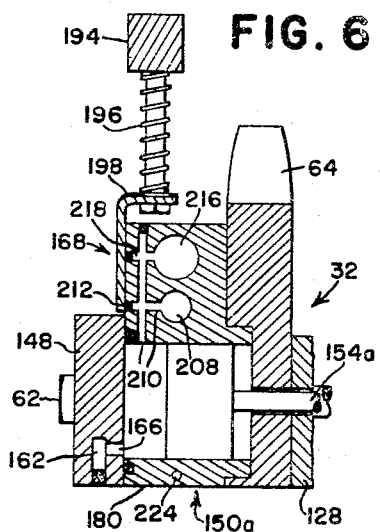
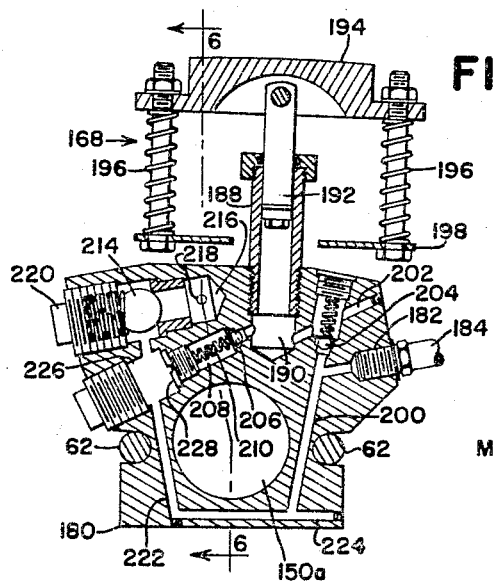
INVENTOR.
M. W. FORTH

United States Patent Office 3,324,808
Patented June 13, 1967

3,324,808
MATERIAL COMPRESSING MACHINE WITH ADJUSTABLE DIE MEANS
Murray W. Forth, Moline, Ill., assignor to Deere & Company, Moline, Ill., a corporation of Delaware
Filed Nov. 2, 1960, Ser. No. 66,874
28 Claims. (Cl. 107—14)

This invention relates to a material compressing machine and more particularly to a machine for compressing agricultural crops, for example, into relatively small high-density forms commonly known as wafers or pellets. More particularly, the invention relates to improvements in the die means for forming the compression or extrusion products.

Machines for producing wafers or pellets or equivalent extrusion products as relatively small articles for animal feed are known, but heretofore these machines have handled products of granular or pulverulent nature, as distinguished from agricultral forage products such as hay and the like, which has heretofore been customarily handled in the form of relatively large bales ranging from, say, 14 x 14 x 30 inches to 18 x 18 x 48 inches and upward and weighing in the order of from 50 to over 100 pounds. However, considerable interest has developed recently in the processing of forage crops in such manner as to produce a wafer or pellet compressed to an extremely high degree so that its total volume is on the order of two to fifteen cubic inches and its unit density is in the range of 19 to 60 pounds per cubic foot. These factors will vary, of course, with the nature of the roughage and its moisture content. Present operations have been conducted with roughage having a moisture content up to the range of approximately thirty-five percent by weight.

Such factors as moisture content, chemical change, inherent nature of the material etc. affect either or both of the frictional and compressibility characteristics of the material and these in turn play an important part in the process of compaction, extrusion and discharge of the product from the forming dies, and therefore require that the forming dies be of special construction. According to the present invention, these dies are further improved by the provision of means for automatically adjusting the several die openings as to the resistances thereof to passage of material therethrough so as to continuously and automatically compensate for variations in the above characteristics and thereby to maintain therein a substantially uniform compaction pressure of predetermined value on all die openings regardless of size. In this respect, the broad features of the invention are not limited to the handling of forage crops but are applicable as well to the compaction of other types of material. The friction factors referred to develop in the contact between the material and the walls of the die openings and accordingly affect the rate of passage of the material, besides which some material is more easily compressed than others.

It is a specific object of the invention to provide a plurality of adjusting means, preferably in the form of hydraulic cylinders or equivalent motors, interconnected in parallel by means such as a manifold which is pressurized at a pressure value sufficient to secure the optimum pressure value in the system or circuit thus provided. For this purpose, fluid is added to the system, either intermittently or at intervals, to maintain the selected pressure, and at a volume in excess of that required, and this excess is handled by by-passing same to a reservoir, for example, by a relief valve set at the selected pressure. The relief valve also has a safety function because, in the handling of agricultral products, foreign objects often find their way into one or more of the die openings, thus creating a condition of excess pressure which, if not relieved, could cause either extensive damage to the machine or a build-up of pressure on die openings in which such build-up is not desired.

As a further object in the improvement of the die means, provision is made for optionally increasing the number of die openings in a single die, as by the provision of a division plate and associated components which will divide a single row of die openings, for example, into a double row of die openings.

The foregoing and other important objects and desirable features inherent in and encompassed by the invention will become apparent as a preferred embodiment thereof is disclosed in detail in the ensuing description and accompanying sheets of drawings, the several figures of which are described below.

FIG. 1 is a fragmentary plan view of the cooperative die means, broken lines being used to illustrate means for feeding compressible material to the die means.

FIG. 2 is a side elevation of the structure shown in FIG. 1, with the die means shafts shown in section.

FIG. 3 is an enlarged fragmentary section as seen generally along the line 3—3 of FIG. 2.

FIG. 4 is a section, on the scale of FIG. 3, taken along the staggered section line 4—4 of FIG. 1.

FIG. 5 is an enlarged sectional view of the pump used for the regulating means.

FIG. 6 is a section taken on the line 6—6 of FIG. 5.

FIG. 7 is a reduced elevation of one of the adjustable die rings.

FIG. 8 is an enlarged view, substantially on the scale of FIG. 3, showing a die construction in which the number of die openings is doubled.

FIG. 9 is a fragmentary plan view of the structure shown in FIG. 8, with the cooperating die wheel omitted to show the lower die wheel in elevation.

The structure shown in FIGS. 1 and 2 is only part of the machine, illustrated here as separated from allied components which include means for picking up harvested crops from the field and delivering them to the die means. However, such allied components are not material here and therefore the disclosure is concentrated on the die means and the improvements therein. However, as representative of part of the allied components, there is shown at 20 a conveyor trained about a plurality of sprockets 22, 24 and 26, for example, in such manner as to have an upper concave or arcuate run 28 and a downwardly and then forwardly extending return run 30. The conveyor 28 is instrumental in delivering compressible material, such as forage crops, for example, to a pair of cooperative die means, here taking the form of die wheels designated in their entireties at 32 and 34. These wheels, as will be described hereinafter in detail, run rim-to-rim and respectively in the directions of the arrows 36 and 38 so as to form at the point at which the rims are tangent and circumferentially ahead of said point a bite representing a feeding zone 40. The delivery run of the conveyor 20 travels in the same direction as the wheel 32 (arrow 36) so that material is delivered to the bite 40 for compression between the wheels and for subsequent compaction, accumulation and extrusions through die openings (to be described below) in the wheels.

As best seen in FIG. 1, the rims of the wheels 32 and 34 are relatively narrow and the width of the conveyor 20 exceeds the wheel dimension by a considerable amount. This means that material carried by the conveyor 20 may be in substantially large volume, albeit relatively loose or fluffy. As part of the basic machine, but not involved in the present invention, there is provided on the wheel 32 a coaxial extension 42 which is in the form of a drum having a partly spherical outer contour which is of course concentric with the delivery run 28 of the conveyor 20. Thus, material carried by the conveyor is preliminarily compressed between the under surface of the drum 42 and the delivery run 28, and it will be noted that this compression is in a direction radially of the wheel 32.

The wheel 32 has at one side thereof, which is the left side in the actual machine, backing means in the form of a radial ring or plate 44 which is coaxial with the wheel 32 and which is of such diameter as to radially overlap at least a portion of the bite 40. It will be noted also that the backing ring 44 runs generally along the left-hand side of the conveyor 20. This backing ring, in conjunction with a partly conical drum 46, operates to narrow or precompress the stream of crops on the delivery run 28 to an area substantially equal to the axial width of the rims of the wheels 32 and 34, which precompression, in a direction axially of the wheels, occurs generally in the zone labelled 48 in FIG. 1. This zone corresponds with that portion of the bite 40 in which the material begins to be compressed between the rims of the two wheels. The drum 46 is mounted on any suitable universal mounting so that its axis of rotation, labeled by the line A—A in FIG. 1, remains constant, and the drum is hollow so that it encircles a portion of the other drum 42. These details are covered in my copending application, Ser. No. 661, filed Jan. 5, 1960, now Patent No. 3,249,069, as already pointed out, are not material to the present invention but are described for the purpose of orienting the improvements in the die wheels 32 and 34.

The basic framework of the machine may include suitable support structure which carries a pair of transverse parallel shafts 50 and 52 which respectively carry the wheels 32 and 34 fo relative rotation on parallel axes. The wheel 32 includes any appropriate hub, as at 54, which in turn carries concentrically therewith annular die means designated in its entirety by the numeral 56. The other die wheel may be substantially identically constructed, having a hub 58 and concentric annular die means 60.

The hub 54, in addition to the annular die means or annulus 56, carries concentrically therewith, as by a plurality of relatively long bolts 62, a driving sprocket 64. A matching sprocket 66 is concentrically carried by the hub 58 of the other wheel, again long bolts, as at 68, being employed for the purpose. A driving chain 70 is trained over the sprockets and is driven by any suitable source of power (not shown) to drive the wheels 32 and 34 in the previously indicated directions (arrows 36 and 38).

The die wheel 32, particularly in that portion thereof forming the annulus 56, is made up of first and second or inner and outer rings or circular plates 72 and 74, coaxially spaced apart in parallel radial planes and rigidly secured together by means including in part the previously described long bolts 62 and in part by additional bolts 76. The diameters of the plates 72 and 74 are exceeded by that of the backing ring 44, which is shown as lying at the outer face of the ring 74 (FIG. 3). The heads of the bolts 76 are countersunk in the outer face of the backing ring 44 and serve to tie the ring to the annulus as an integral part thereof. The heads of these bolts appear in FIG. 4.

The annulus 56 is provided with a plurality of substantially radial die openings 78, which are uniformly circumferentially spaced about the annulus by the receipt between the plates 72 and 74 of a like plurality of generally wedge-shaped die blocks or spacers 80. These are secured in place by the bolts 62 and 76, already described. The outer end faces of the blocks, as at 82, lie substantially on a circular peripheral surface which is exceeded in diameter only by the outer peripheral edges of the rings 72 and 74, which are beveled as shown in FIG. 3 for purposes to presently appear. This surface also provides the periphery at which each die opening 78 leads radially outwardly at what may be regarded as an inlet end 84; that is, the end in which material is received for extrusion through the die opening, the material exiting at the opposite end 86 as a compression or extrusion product having substantially the same cross-sectional shape as the opening. Each opening is therefore substantially square in cross-section, being defined at opposite sides by opposed portions of the rings 72 and 74 intervening between a pair of neighboring die blocks 80, and the circumferentially spaced faces of such neighboring pair of die blocks.

The annulus of the other wheel 34 is similarly constructed, being made up of a pair of similar rings or circular plates 88 and 90 spaced apart by a plurality of uniformly circumferentially spaced generally radial die blocks 92 so as to provide a like plurality of radial die openings 94. Each of these openings has an outer inlet end 96 opening to the peripheral surface of the annulus 60 as defined by the end faces 110 of the die blocks 92, and each opening further has an inner or outlet end 98. The annulus 60 is mounted on the hub 58 in part by the circle of bolts 68 already described and in part by an additional circle of bolts 100. It will be observed that the die wheel 34 does not have an annular ring like the ring 44 on the die wheel 32. Hence, the outer face of the outer ring 90 of the die wheel 34 can run against the inner face of that portion of the ring 44 that exceeds the diameter of the annulus 56 in the die wheel 32. The plates 72 and 74 are beveled in outwardly divergent relationship as shown in FIG. 3, and the outer edges of the plates 88 and 90 on the annulus 60 of the die wheel 34 are correspondingly beveled in an outwardly convergent relationship so that the two configured surfaces thus afforded with match. This arrangement facilitates the feeding of material by avoiding substantial land areas. As will be apparent from FIG. 4, the die wheels are arranged and their rotation is timed so that the die openings of one wheel, in addition to passing the feeding zone 40 and registering therewith, also successively register with the end faces of the die blocks of the other wheel. For example, in the area of a straight line drawn between the axes of rotation of the wheels, a die opening 94 of the wheel 34 mates with the end face 82 of a die block 80 in the wheel 32. Thus, the end face 82 of the die block 80 forces material into the inlet end 96 of the die opening 94. As the wheels continue to rotate, successive die blocks mate with successive die openings and ultimately material is accumulated and compacted in the openings. Subsequently, the material is discharged through the respective outlets 86 and 98 of the die openings 78 and 94, the material of course moving radially inwardly of the respective wheels, moving in the direction of the arrow 102 in the case of the wheel 32 and in the direction of the arrow 104 in the case of the wheel 34. The hubs or disk portions thereof for the wheels are imperforate and the compression products discharged must thence exit axially. The wheels are provided respectively with discharge or shield rings 106 and 108 to facilitate ultimate discharge of the products.

As will be evident, the annuli 56 and 60 respectively for the wheels 32 and 34 are, with the exception of the ring 44 and the difference in bevels at the outer peripheral edges of the plates, substantially identical. Each die block 92 in the wheel 34 has an end face 110 similar to the end face 82 on each die block 80 in the other wheel. Likewise, each die opening 94 in the wheel 34 is formed by the related walls of the blocks and plates in the portions thereof bounding the opening.

FIG. 7 shows, on a reduced scale, a side view of the ring 90. Since this is identical to the ring 74, with the exception already noted, the single illustration may be taken as representative of both rings. The ring 90 has therein two circles of bolt holes 112 and 114 which respectively receive the bolts 68 and 100. In the case of ring 74, corresponding bolt holes would receive the bolts 76 and 62. Of significance in the design of each ring, is the provision therein of a plurality of slits 116, each pair of which straddles and is parallel to a radius and extends from the inner periphery of the ring to a point adjacent to the outer periphery, thus leaving a plurality of tongues 118 which, when the wheel is assembled, afford the side walls for the openings 94 respectively opposite the rigid side walls of the other plate 88. Each tongue is deflectible inwardly and, to facilitate this, the junction of each tongue with the main body of the ring may be milled out or otherwise relieved. Slits 122 in the ring 74 and corresponding to the slits 116 afford in the ring 74 a similar plurality of deflectible tongues 124. It is clear of course that in each case a tongue 124 (or 118) intervenes between a pair of neighboring die blocks, so that the remaining walls of each opening are fixed and the tongue is the deflectible wall. The tongue, being secured as it were at its outer end is free at its terminal inner end, which is the end proximate to the discharge end of the associated die opening. Therefore, the tongue may be deflected back and forth to restrict or expand the opening and thus to vary the cross-sectional area of the discharge or outlet end, and this of course will create variations in the pressure on the material extruded through the respective opening.

It has been previously proposed to provide a construction generally like that described so far and to individually adjust the deflectible tongues or side walls of the openings by such devices as screw-threaded means. This has proven relatively satisfactory in conditions where the above-described characteristics of the material are relatively uniform or constant. However, as has been learned, material, even of the same kind, has different frictional and/or compressibility characteristics. This is especially true in forage crops. For example, material having a low coefficient of friction and/or high compressibility, or "softness," will require a die opening offering a certain relatively high resistance to the passage of material therethrough, as by a decrease in size or taper of the opening, but the same would not obtain for material having opposite characteristics, with the result that the ultimate end products would be of different densities. Moreover, it should be understood here that these pellets or wafers are not formed in such manner that each accumulation of material is ejected as a single end product. Rather, the material accumulates in each die opening as the wheels continue to rotate and later material forces previously accumulated and compacted material incrementally toward the discharge ends of the openings and portions are thus ultimately extruded beyond the outlets of the openings and break off as they attain such length and weight as will overcome the adhesion forces tending to hold the extruded material to the material still in the die. Such lengths may vary, for example, from 2" to 4" or so in 2" x 2" pellets because of variations in material; although, in a theoretically perfect machine, all pellets should be alike. But in actual practice, pellets will be found having the same general cross-sectional shape as the openings from which they are extruded and having lengths that vary according to the break-off point. In other words, a pellet or wafer will not be anywhere near as long as one of the die openings. Consequently, as the material is accumulated in what may be regarded as charges, variations in one or more of the above factors may occur from charge to charge and consequently the need for adjustment of a die opening will arise quite frequently. Therefore, it is desirable that some automatic means be provided, preferably such means as will be responsive to the nature of the material so as to maintain a substantially uniform resistance to the passage of material through the openings and thereby to obtain uniform pressure on the material, which is here accomplished by regulating the sizes or tapers of the die openings to correspond thereto. That is to say, such means will function to increase the resistance characteristic of a die opening when it senses material of relatively low friction and/or high compressibility and to decrease the restriction resistance when it senses material of opposite nature. On this view of the situation, resistance will vary directly with the die opening taper, and this is accomplished in the present invention by regulating means operative automatically to control the taper-control elements afforded by the deflectible walls or tongues 118 and 124. A similar means is provided on each die wheel, and that provided on the die wheel 34 will be described first.

There is provided on the die wheel 34 a spacer ring 126 which is assembled concentrically between the ring 90 and the sprocket 66, and this spacer is approximately apertured so that the bolts 68 may pass therethrough. This is more readily apparent in connection with the construction of the die wheel 32 wherein a spacer ring 128 reveals the passage therethrough of the corresponding bolts 62. The spacer ring 126 has additionally therein a circular row of apertures 130 respectively in register with a circular row of apertures 132 in the next adjacent sprocket 66. These apertures are also respectively in transverse alinement with the deflectible wall portions or tongues 118, and each pair of registered apertures carries slidably therein a piston rod 134 of a piston 136 which forms part of a fluid motor 138 having a cylinder 140. There are of course as many motors 138 as there are deflectible tongues 118, and the sprocket 66 may be recessed at 142 to carry the cylinders 140 of the motors.

A manifold ring 144 is concentrically disposed axially outwardly of the motors, and these motors are open respectively at their outer ends to abut against the inner radial face of the manifold ring 144, appropriate seals being provided at 146 to afford a fluid-tight relationship. The long bolts 68 extend through the manifold ring 144 to secure the same rigidly to the annulus as a part thereof. Any equivalent construction could be provided to accomplish the broad novel concept, but the specific construction illustrated has novel advantages nevertheless. It will thus be seen that pressurizing of each motor 138 will expel its piston 136 to the right to act through the piston rod 134 on the associated deflectible wall or tongue 118, thus effecting control of the taper of the associated die opening 94 toward its discharge end. In other words, the motor acts on the tongue 118 and reacts against the manifold ring 144 which serves as a backing means for that purpose.

The basic construction is duplicated in connection with the annulus 56 of the wheel 32, the spacer ring 128 of which has already been described. Here again, a manifold ring shown at 148 is secured concentrically in place by the bolts 62 in axially spaced relation to the sprocket 64 so that a plurality of fluid motors 150 may be accommodated therebetween. Each of these motors has a piston 152 and a piston rod 154 which operates on the associated deflectible wall or tongue 124.

It is a further feature of the invention that the spacer ring, sprocket motors and manifold ring may be retained together as a sub-assembly even though the long bolts 62 (68) are removed. This is best shown in FIG. 3, wherein it is clear that the spacer ring 128 has a tapped bore 156 therein which receives the inner end of a capscrew 158 which is in turn passed through appropriate apertures in the manifold ring 148 and sprocket 64. There are several of these capscrews, each of which is spaced radially outwardly of the circle of bolts 62 and each of which has its angular location such that it lies between a pair of adjacent motors, 150 in the case of the wheel 32 and 138 in the case of the wheel 34.

The manifold ring 144 for the wheel 34 has provided therein an annular passage 160, and a similar passage 162 is provided in the other manifold ring 148. In the preferred construction illustrated, the passage in each case is formed by forming an annular slot in the ring and then welding the slot along the inner periphery of the ring. In the case of the ring 144, its annular passage is connected to the motors 138, in each case as by a short passage 164. There are of course as many passages 164 as there are motors 138, and the motors are therefore interconnected in parallel, the motors and the passage means 162 and 164 comprising fluid-receivable means. The same construction is repeated in the case of wheel 32, that manifold ring having its annular passage 162 connected to the individual motors 150 by short outlet passages 166.

The fluid-receivable means established by the motors 150 and manifold passages 162 and 166, in the case of the wheel 32, is capable of being pressurized by a pressure source, here including a pump 168 which in this particular instance incorporates one of the motors, which motor is designated 150a for the purposes of clarity (FIGS. 5 and 6). The fluid-receivable means for the wheel 34 is separate from that in the wheel 32 and has its own pressure source, here a pump 170 identical to the pump 168.

The two pressure sources thus established are operated intermittently as the wheels rotate. In other words, the pumps operate in response to operation of the wheels. However, the nature of the pumping arrangement here is the result of the wheel arrangement, being presently deemed preferable because both die wheels rotate. However, other pump arrangements could be used, such as continuously operating types, particularly where a different die wheel arrangement is employed, such as where one of the wheels is stationary and the other wheel rolls around the periphery of the stationary wheel. In the present case, the wheel 32 carries lug means or an operator 172, bolted thereon in any suitable fashion, and disposed generally diametrically opposite the pump 168. A similar operator 174 on the wheel 32 functions in conjunction with the pump 168, as will best be seen in FIG. 2. That is to say, the operator 174 on the wheel 34 operates the pump 168 on the wheel 32, and the operator 172 on the wheel 32 operates the pump 170 on the wheel 34.

From the description thus far, it will be seen that each wheel carries a plurality of hydraulic motors, one for each of the adjustable walls in each of the die openings. In each case, the motors are part of the fluid-receivable means pressurizible by the respective pump (168 or 170). Since the motors are interconnected in parallel, the pressure in each fluid-receivable means will be the same in each motor and each motor will therefore act on its own deflectible or adjustable wall in such manner as to transfer that pressure to its opening and thereby to control the taper of such opening according to the nature of the material accumulated therein and, as explained above, extruded therefrom. In the case of the motor 150a, which is incorporated in the pump 168, the piston rod is designated 154a.

Each fluid pressure source includes a reservoir, 176 for the wheel 32 and 178 for the wheel 34. In each case, the reservoir may be of any suitable type, such as a bladder having an arcuate form as shown and attached suitably to the annulus of the associated wheel.

As best shown in FIGS. 5 and 6, the pump 168 comprises a housing 180, which is bored to incorporate the motor 150a. This housing has a fluid inlet passage 182, which is connected by a line 184 to the reservoir 176. In the case of the wheel 34, a line 186 connects its reservoir 178 to its pump 170. A sleeve 188 is threaded into a tapped bore 190 and affords a pump cylinder in which a piston 192 is capable of reciprocation as the wheel 32 rotates, the piston having thereon an external driving head 194 engaged by the operator 174 on the other wheel 34. The driving head 194 is spring-loaded outwardly by a pair of springs 196 which act against a bracket 198 carried by the pump housing.

Drilled passages 200 and 202 connect the inlet 182 to the pump chamber afforded by the interior of the sleeve 188, and a check valve 204 in the passage portion 200 is capable of being opened to admit fluid from the reservoir as the piston 192 moves outwardly. When the piston is moved inwardly, the fluid is forced past a check valve 206 in a check valve chamber 208 which leads from the bore 190 to the interior of the motor 150a as via associated drilled passages 210. Here, as in the case of other passages, they are formed mainly by drilling and the open ends thereof are welded shut, as at 212 (FIG. 6). This same characteristic of the design will be readily seen in the instances of the other passages and further description is deemed to be unnecessary. Since the motors are interconnected in parallel, the supply of fluid to the motor 150a pressurizes the entire fluid-receivable means and, as stated above, the pressure is the same in all motors. The operation of the pump is sufficient to supply fluid under pressure at a value slightly in excess of what is needed, and the excess volume is returned to the reservoir 176 by means including a relief valve 214. The relief valve is carried in a bore 216 and this in turn connects to the circuit including the motors and manifold passage by an extension of the drilled passage 210 (FIG. 6). A short cross passage which accomplishes this result is shown at 218. An adjustable plug 220, which is used to vary the pressure value, holds the spring that acts against the check valve to normally keep same closed, so that when pressure developed in the system is below the relief valve setting, the fluid will be delivered to the individual motors from the chamber or bore 190, past the check valve 206 and to the motor 150a via the passage system 216–218–210.

The reservoir side of the check valve leads back to the reservoir via a series of drilled passages 222 and 224, the latter of which leads to the previously described drilled passage 200. The passage 222 leads from behind the check valve to the passage 224 and at the same time intersects a counter bore 226 behind a plug 228 which closes the check valve chamber 208. In other words, when the check valve 206 opens, fluid cannot get past the plug 228 but must enter the passage system 208–210–216–218.

The die openings in both wheels are here the same and theoretically the extruded material should all be of the same cross-sectional area, density, weight, etc. However, as already pointed out, the coefficient of friction and/or compressibility of the material vary from "charge to charge," and accordingly the pressure in individual chambers or die openings will vary but this is compensated for automatically by the pressurized system in which the motors are connected in parallel, and those openings handling material of low friction and/or high compressibility will be restricted to a greater extent than those in which the material has opposite characteristics. Another advantage of the arrangement is that in the event that a foreign object enters one of the die openings and its nature is such that it tends to expand the opening, the reflected pressure rise will be accommodated by the relief valve. The relief valve can of course be set at any desired pressure within a predetermined range.

In the modified form of the invention shown in FIGS. 8 and 9, provision is made for increasing the number of die openings and die blocks. That is to say, the structure already described comprises in each wheel a single annulus having a single row of openings and blocks. In FIGS. 8 and 9, there are two rows, which is made possible by inserting between the side elements or plates 72 and 74 of the wheel 32 an annular partition element in the form of a circular division plate or splitter ring 230, and two rows of smaller die blocks or spacer elements are used at 232, one row at each side of the ring 230. This provides a pair of annuli side by side, and the die blocks afford two rows of die openings 234. In the case of the wheel 34, having a similar splitter ring 232', die blocks at 236 replace those previously used and these of course provide a plurality of die openings (not shown) identical to those at 234 in the wheel 32. Other characteristics of the invention remain the same, such as the timed relationship of the wheels, but the production of pellets or extruded material will result in smaller sizes. The radially inner portion of the splitter plate 230 may be formed identically to the plates 74 and 90, and to this extent will have deflectible wall portions 238. Hence, as pressure is built up by an associated motor through its piston rod 154, the deflectible wall portion 124 of the ring 74 will move inwardly to restrict it sopening, as indicated in dotted lines in FIG. 8. The material between the walls 124 and 238 will transfer the force to the wall 238 so that it likewise will shift to the dotted line position shown in FIG. 8. It will be understood of course that the amount of movement of the wall 238 will be only one-half that of the wall 124. The splitter plate 232' is similarly constructed. As will also be noted in FIGS. 8 and 9, the outer peripheral edge of the splitter plate in each case may be beveled as shown to further reduce land area at the periphery of the associated annuli.

Features and advantages, other than those categorically enumerated, will readily occur to those versed in the art, as will many modifications and alterations in the preferred structure disclosed, all of which may be achieved without departure from the spirit and scope of the invention.

What is claimed is:

1. In a machine of the class described: annular die means including a pair of circular plate-like members coaxially spaced apart in parallel radial planes and a plurality of radial block-like spacers disposed between and rigid with the members in uniformly circumferentially spaced relation to define with the members a plurality of similar radial die openings receivable of compressible material fed thereto for extrusion therethrough, portions on one member between neighboring spacers providing an annulus of control elements, one for each opening and arranged for movement toward and away from an opposite portion of the other member to respectively restrict and expand the opening; a supporting ring of generally the same diameter as said annulus and secured to the die means in coaxially outwardly spaced relation to said annulus; a plurality of fluid motors, one for each control element, arranged between the ring and the annulus in circumferentially spaced relation according to the elements and acting respectively on the elements and reacting on the ring for extension and retraction to incur restriction and expansion, respectively, of the associated openings; passage means interconnecting the motors in parallel and with the motors a fluid-receivable means; and a fluid pressure source connected to and for pressurizing said fluid-receivable means at a value to cause adjustment of the openings via said elements such as to maintain substantially uniformly in all openings the same pressure on material received therein.

2. The invention defined in claim 1, in which: the passage means is formed in the ring and said ring has a plurality of fluid outlets leading from said passage means respectively to the motors.

3. The invention defined in claim 1, including: relief valve means connected to said fluid-receivable means and openable in response to pressure rise therein in excess of the aforesaid value.

4. The invention defined in claim 1, including: a fluid reservoir; means connecting the source to the reservoir; means for operating said source to supply fluid to said fluid-receivable means in excess of its volumetric needs; and relief valve means connected between said fluid-receivable means and the reservoir and openable to discharge excess fluid to said reservoir when fluid pressure exceeds said value.

5. The invention defined in claim 4, in which: the die means is rotatable about its axis; and the pressure source is carried by the die means and is operated by rotation of said die means.

6. The invention defined in claim 1, including: a second die means similar to the first mentioned die means; said two die means being arranged with the outer periphery of one running against the outer periphery of the other, one of said die means being rotatable relative to the other and said die means being so timed that the peripheral portions of the spacers of one successively register with the peripheral ends of the openings of the other so that material introduced between the peripheries of the die means is forced into the openings of one by the spacers of the other; said second die means having fluid-receivable means similar to that of the first-mentioned means and including a second fluid pressure source; and means on each die means for operating the pressure source on the other die means as said one die means rotates relative to the other.

7. The invention defined in claim 1, in which: the die means is in the form of a wheel in which the openings have material inlets at circumferential portions of the wheel and the wheel is rotatable; means is provided to feed material to a feeding zone at a part of said circumferential portion and past which the inlets move successively as the wheel rotates, said last-named means including means for forcing material into said openings as said inlets pass said zone; and said pressure source is operative in response to rotation of the wheel.

8. The invention defined in claim 7, in which: the pressure source includes a pump carried by the wheel and including a movable part; and the feeding means includes a part engageable with the pump part to operate same as said pump part is carried by the wheel past said feeding zone.

9. In a machine of the class described: die means including a pair of plate-like members spaced apart in parallel planes and a plurality of block-like spacers disposed between and rigid with the members in uniformly spaced relation to define with the plates a plurality of similar die openings receivable of compressible material fed thereto for extrusion therethrough, portions on one member between neighboring spacers providing a row of control elements, one for each opening and arranged for movement toward and away from an opposite portion of the other member to respectively restrict and expand the opening; a supporting member secured to the die means in outwardly spaced relation to said row; a plurality of fluid motors, one for each control element, arranged between the member and the row in spaced relation according to the elements and acting respectively on the elements and reacting on the member for extension and retraction to incur restriction and expansion, respectively, of the associated openings; passage means inter-connecting the motors in parallel and forming with the motors a fluid-receivable means; and a fluid pressure source connected to and for pressurizing said fluid-receivable means at a value to cause adjustment of the openings via said elements such as to maintain substantially uniformly in all openings the same pressure on material received therein.

10. The invention defined in claim 9, in which: the passage means is formed in the member and said member has a plurality of fluid outlets leading from said passage means respectively to the motors.

11. The invention defined in claim 9, including: relief valve means connected to said fluid receivable means and openable in response to pressure rise therein in excess of the aforesaid value.

12. The invention defined in claim 9, including: a fluid reservoir; means connecting the source to the reservoir; means for operating said source to supply fluid to said fluid-receivable means in excess of its volumetric needs; and relief valve means connected between said fluid-receivable means and the reservoir and openable to discharge excess fluid to said reservoir when fluid pressure exceeds said value.

13. The invention defined in claim 12, in which: the die means is movable; and the pressure source is carried by the die means and is operated by movement of said die means.

14. In a machine of the class described: die means having a plurality of similar die openings receivable of compressible material fed thereto for extrusion therethrough, said die means including a plurality of movable elements operative respectively on the openings for effecting adjustment of the resistances thereof to the passage of material therethrough; and regulating means for variously adjusting the openings to create therein such resistances as will maintain in all openings a pressure of the same predetermined value on the material therein, including a plurality of fluid motors carried by the die means and equal in number to and acting respectively on the elements, each motor being fluid-pressurizable and fluid-exhaustible to cause its element to respectively incur increase and decrease in the resistance in its opening, fluid line means interconnecting the motors in parallel, and fluid pressure means connected to and for pressurizing said line means and including a relief valve openable automatically in response to fluid pressure rise in said line means in excess of the aforesaid value.

15. In a machine of the class described: first and second annular die means, each having a peripheral surface and provided with a plurality of die openings spaced uniformly circumferentially apart and a plurality of dies, one between each pair of openings and presenting a die face at said surface, said openings respectively having inlets and outlets, said inlets opening at said surface for receiving compressible material fed thereto for extrusion therethrough, said die means being relatively rotatable and arranged to run with the surface of one running against the surface of the other so that material fed to the bite between said surfaces is forced into the openings of one die means by the die faces of the other, each of said die means including portions defining the openings and one portion for each opening comprising a control element movable relative to another portion to change the taper of its opening toward its outlet; fluid-receivable means on each die means including a plurality of fluid motors acting on the associated elements and pressurizible to cause the elements to increase the associated taper and fluid passage means interconnecting the motors in parallel to provide two separate fluid circuits, one on each die means; first and second separate fluid-pressure sources respectively connected to said first and second circuits, each source being operative to pressurize its circuit to cause taper adjustment in the openings via said elements such as to maintain substantially uniformly in all openings the same pressure on material received therein; and means on each die means for operating the fluid pressure source on the other as said die means rotate relatively.

16. Die means for a machine of the class described, comprising: first and second elongtaed outer plates disposed respectively in spaced apart parallel planes; an elongated parallel division plate disposed spatially between the outer plates; a plurality of similar die blocks rigidly mounted between the division plate and the first outer plate in uniformly spaced apart relation to provide a first row of uniformly spaced apart die openings; a second plurality of similar die blocks rigidly mounted between the division plate and the second outer plate in uniformly spaced apart relation and respectively transversely alined with the first plurality of blocks to provide a second row of die openings similar to those in the first row; said openings respectively having inlets at a common surface for receiving compressible material for extrusion therethrough and further having outlets for discharging such material; said division plate having the portions thereof respectively between the openings of one row and those of the other movable crosswise of the openings of the first row adjacent to the outlets thereof for restricting and expanding said outlets; and said second outer plate having portions thereof respectively transversely alined with said division plate portions arranged for movement crosswise of the openings in the second row adjacent to the outlets thereof for restricting and expanding said openings in the second row.

17. The invention defined in claim 16, including: means acting on the movable portions of the second outer plate for moving said portions to restrict the respective openings in the second row and thereby to compress material in said second row openings against the movable portions of the division plate to move said division plate portions so as to cause restriction of the respective openings in the first row.

18. Die means for a machine of the class described, comprising: first and second elongated outer plates disposed respectively in spaced apart parallel planes; an elongated parallel division plate disposed spatially between the outer plates; a plurality of similar die blocks rigidly mounted between the division plate and the first outer plate in uniformly spaced apart relation to provide a first row of uniformly spaced apart die openings; a second plurality of similar die blocks rigidly mounted between the division plate and the second outer plate in uniformly spaced apart relation and respectively transversely alined with the first plurality of blocks to provide a second row of die openings similar to those in the first row; said openings respectively having inlets at a common surface for receiving compressible material for extrusion therethrough and further having outlets for discharging such material; each plate having portions thereof respectively alongside the openings defining walls for the openings; one of the plates having its walls movable crosswise of the respective openings in the first row adjacent to the outlets thereof for restricting and expanding said outlets; and another of the plates having its walls movable crosswise of the respective openings in the second row adjacent to the outlets thereof for restricting and expanding said outlets.

19. Die means for a machine of the class described, comprising: first and second elongated outer plates disposed respectively in spaced apart parallel planes; an elongated parallel division plate disposed spatially between the outer plates; a plurality of similar die blocks disposed between the division plate and the first outer plate in uniformly spaced apart relation to provide a first row of uniformly spaced apart die openings; a second plurality of similar die blocks disposed between the division plate and the second outer plate in uniformly spaced apart relation and respectively transversely alined with the first plurality of blocks to provide a second row of die openings similar to those in the first row; means rigidly but removably securing the plates and blocks together as a unitary but separable assembly; and said openings respectively having inlets at a common surface for receiving compressible material for extrusion therethrough and further having outlets for discharging such material.

20. In a machine of the class described: die means having first and second parallel rows of similar die openings receivable of compressible material fed thereto for extrusion therethrough, said openings respectively having material-receiving inlets at a common surface and further respectively having material discharging outlets, the openings in the first row lying respectively alongside the openings in the second row; a first set of elements carried by the die means and acting on and for controlling restriction and expansion of the cross-sectional areas of the openings in the first row adjacent to their outlets; a second set of elements carried by the die means and acting on and for controlling restriction and expansion of the openings in the second row; means for operating the elements in said first set; and said sets being arranged so that operation of the first set of elements to restrict the first row outlets acts through material contained in said first row of openings to operate the second set of elements to restrict the outlets in the second row.

21. In a machine of the class described: die means having first and second parallel rows of similar die openings receivable of compressible material fed thereto for extrusion therethrough, said openings respectively having material-receiving inlets at a common surface and further respectively having material-discharging outlets, the openings in the first row lying respectively alongside the openings in the second row; a first set of elements carried by the die means and acting on and for controlling restriction and expansion of the cross-sectional areas of the openings in the first row adjacent to their outlets; means for operating the elements in said first set to restrict the respective openings in the first row; and a second set of elements carried by the die means and acting on and for controlling restriction and expansion of the openings in the second row and operative in response to restrictive operation of the elements in the first set to restrict the corresponding outlets in the second row.

22. In a machine of the class described: die means having first and second parallel rows of similar die openings receivable of compressible material fed thereto for passage therethrough and discharge therefrom as an extrusion product, said openings respectively having material-receiving inlets at a common surface and further respectively having material-discharging outlets and affording resistance therein to the passage of material therethrough; a first set of elements carried by the die means and acting on and for varying the resistances in the openings in the first row; means for operating the elements in said first set to vary said resistances for the respective openings in the first row; and a second set of elements carried by the die means and acting on and for varying the resistances in the openings in the second row.

23. In a machine of the class described: annular die means comprising a pair of coaxial side-by-side annuli, each having an annular row of uniformly circumferentially spaced generally radial die openings, said die means including annularly arranged partition means separating one row of openings from the other; and means rigidly but separably securing the two annuli together with the partition means therebetween.

24. In a machine of the class described: annular die means comprising a pair of coaxial side-by-side annuli, and an annular partition element sandwiched between the annuli to separate one from the other, said annuli respectively having annular outer side elements spaced axially oppositely outwardly from the partition element and further respectively having a plurality of uniformly circumferentially spaced generally radial spacer elements, one between the partition element and each side element and affording a pair of annular rows of die openings, portions of the associated elements bordering each opening providing walls for such opening having interior surfaces setting up resistance to material extruded through the opening, one wall for each opening in each annulus being adjustable to vary its resistance to material; means securing the annuli together as a unit assembly; and means for adjusting said adjustable walls.

25. In a machine of the class described: die means including a pair of plates spaced apart in parallel planes and a plurality of spacer means disposed between and rigid with the plates in uniformly spaced relation to define with the plates a plurality of similar die openings receivable of compressible material fed thereto for extrusion therethrough, portions of one plate between neighboring spacer means providing a row of control elements, one for each opening and arranged for movement toward and away from an opposite portion of the other plate to respectively restrict and expand the opening; a supporting member secured to the die means in outwardly spaced relation to said row; a plurality of fluid motors, one for each control element, arranged between the member and the row in spaced relation according to the elements and acting respectively on the elements and reacting on the member for extension and retraction to incur restriction and expansion, respectively, of the associated openings; passage means interconnecting the motors in parallel and forming with the motors a fluid-receivable means; and a fluid pressure source connected to and for pressurizing said fluid-receivable means.

26. In a machine of the class described, annular die means comprising: a pair of relatively thin coaxial plate means closely spaced axially apart; a plurality of uniformly circumferentially spaced generally radial spacer means between the plate means and providing a like plurality of die openings; a relatively thin annular partition plate means disposed centrally between and coaxially with the pair of plate means and dividing said plurality of openings into a pair of annular rows of openings of approximately one-half the cross-section of the openings in said plurality of die openings; and means rigidly securing the pair of plate means, the spacer means and the partition plate means together.

27. The invention defined in claim 14, including means for driving the fluid pressure means substantially continually to supply to the fluid line means and fluid motors a volume in excess of that required thereby.

28. The invention defined in claim 14, in which the relief valve is adjustable to selectively vary the aforesaid value.

References Cited
UNITED STATES PATENTS

| | | | |
|---|---|---|---|
| 1,803,344 | 5/1931 | Noxon | 107—8.35 |
| 2,675,768 | 4/1954 | Helm | 107—8.35 |
| 2,958,900 | 11/1960 | Meakin | 18—12 |

FOREIGN PATENTS

| | | |
|---|---|---|
| 602,126 | 7/1960 | Canada. |
| 918,288 | 10/1946 | France. |

WALTER A. SCHEEL, *Primary Examiner.*

JOSEPH D. SEERS, *Examiner.*

C. J. FRIBERG, J. SHEA, *Assistant Examiners.*